United States Patent [19]
Ochiai et al.

[11] Patent Number: 5,238,340
[45] Date of Patent: Aug. 24, 1993

[54] SADDLE SWIVEL HEAD TILTING DEVICE

[75] Inventors: Akira Ochiai, Susono; Yutaka Saito, Numazu; Makoto Sagara, Mishima, all of Japan

[73] Assignee: Toshiba Kikai Kabushiki Kaisha, Tokyo, Japan

[21] Appl. No.: 957,474

[22] Filed: Oct. 7, 1992

[30] Foreign Application Priority Data

Oct. 7, 1991 [JP] Japan .................. 3-259164

[51] Int. Cl.[5] .................. B23C 1/12; B24B 41/00
[52] U.S. Cl. .................. 409/201; 51/166 MH; 409/202; 409/211
[58] Field of Search ............ 409/201, 202, 204, 216, 409/211, 212, 237, 241; 51/99, 126, 68, 166 MH, 47, 34 D, 34 J; 408/130, 46, 234, 236; 92/13.3

[56] References Cited

U.S. PATENT DOCUMENTS

| | | | |
|---|---|---|---|
| 2,911,764 | 11/1959 | Steggeman | 51/166 MH |
| 3,083,617 | 4/1963 | Swanson et al. | 409/211 |
| 3,562,959 | 2/1971 | Dooley, Jr. | 51/47 |
| 3,668,971 | 6/1972 | Dever | 409/202 X |
| 3,823,644 | 7/1974 | Mello | 409/211 X |
| 4,290,239 | 9/1981 | Zimmer | 51/99 X |
| 4,589,174 | 5/1986 | Allen | 409/201 X |

FOREIGN PATENT DOCUMENTS

| | | | |
|---|---|---|---|
| 1046872 | 12/1953 | France | 51/166 MH |
| 610618 | 6/1978 | U.S.S.R. | 409/201 |
| 671999 | 8/1979 | U.S.S.R. | 51/126 |
| 707787 | 1/1980 | U.S.S.R. | 51/99 |
| 491252 | 3/1986 | U.S.S.R. | 409/235 |

*Primary Examiner*—William Briggs
*Attorney, Agent, or Firm*—Cushman, Darby & Cushman

[57] ABSTRACT

The invention relates to improvements in a tilting mechanism for a saddle swivel head for a double housing type machine tool. The saddle swivel head 13 is provided at the sides thereof in the tilting direction with hydraulic cylinders 18R, 18L, to which is connected a hydraulic piping system 19 for giving swivel balancing pressures and back pressures when the swivel head 13 is tilted by a predetermined angle by a tilting driving mechanism. The saddle swivel head 13 is tilted while providing swivel balancing pressures to the hydraulic cylinders 18R, 18L, and after tilting the head by the predetermined angle, back pressures are applied to the hydraulic cylinders 18R, 18L to compensate for a tilting moment of the saddle swivel head 13.

6 Claims, 5 Drawing Sheets

SADDLE SWIVEL HEAD TILTING DEVICE

BACKGROUND OF THE INVENTION

This invention relates to a tilting device for a saddle swivel head for a double housing type machine tool.

A tilting device of a saddle swivel head as shown in FIG. 5 has hitherto been known, and comprises a hydraulic cylinder 2 disposed for tilting movement and having a tilting center portion 1 at the top thereof, and a spindle head 3 which is swingable at a point on the axis of the hydraulic cylinder 2 and to which a tool is clamped, said spindle head 3 being connected through a connecting part 4 to an end of a rod 5 of the hydraulic cylinder 2.

Accordingly, with this device, for example, a tool (not shown) clamped to the end of the spindle head 3 can be tilted to the left in FIG. 5 by moving the rod 5 of the hydraulic cylinder 2 forward a predetermined distance while tilting the hydraulic cylinder 2 to the right with the tilting center part 1 as a tilting center by a tilting means not shown. This causes the tool clamped to the spindle head 3 to be tilted to the left by a predetermined angle.

However, the mechanism as shown in FIG. 5, in which the hydraulic cylinder 2 is provided on the extension of the axis of the spindle head 3, has disadvantages in that a loading moment acting on the hydraulic cylinder 2 varies due to the tilting operation and, moreover, the entire mechanism including the hydraulic cylinder 2 becomes large, which makes it difficult to make the mechanism smaller in size.

SUMMARY OF THE INVENTION

Accordingly, it is an object of the invention to provide a tilting device of a saddle swivel head which enables a tilting moment occurring in the saddle swivel head to be compensated for and which can be made smaller.

According to the invention, there is provided a tilting device of a saddle swivel head for a double housing type machine tool, said saddle swivel head having a saddle mounted for horizontal movement on a cross beam and a head body mounted on said saddle for swivel movement in the left and right directions and having a spindle head thereon, said tilting device comprising:

a tilting driving mechanism connected to said head body and for tilting said head body with a predetermined position as a center;

a pair of hydraulic cylinders arranged at both sides of said head body in the tilting direction with the end of the rod of each of the hydraulic cylinders being connected to each side of said head body, said rod performing a forward and backward movement following a tilted position of the head body; and pressure regulating means for regulating pressure applied to each of said hydraulic cylinders.

With the device as stated above, the saddle swivel head is tilted by the tilting driving mechanism and, at the same time, swivel balancing pressures corresponding to the respective angles of the hydraulic cylinders at the sides of the saddle swivel head in the tilting direction are given to the hydraulic cylinders by a hydraulic piping system. After the saddle swivel head is tilted to a predetermined angle, back pressures are applied to the hydraulic cylinders, so that the tilting moment occurring in the saddle swivel head can be compensated for.

BRIEF DESCRIPTION OF THE DRAWINGS

Other objects and aspects of the invention will become apparent from the following description of an embodiment with reference to the accompanying drawings in which.

DESCRIPTION OF THE PREFERRED EMBODIMENT

Figure 1:
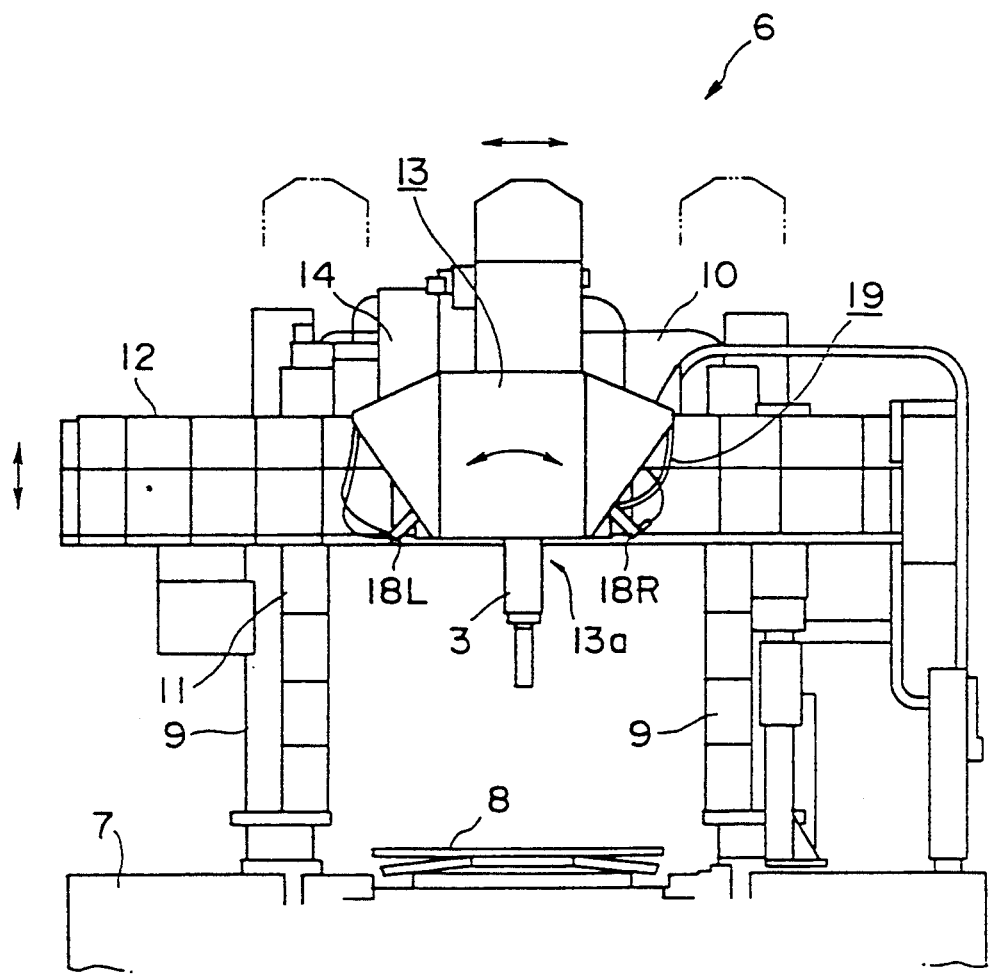
FIG. 1 is a front view illustrating an example of a double housing type planing machine to which a tilting device of a saddle swivel head according to the invention is applied.

Now, a planing machine to which one embodiment of the invention is applied will be explained with reference to FIGS. 1 to 4.

The double housing type planing machine 6 comprises a bed 7; a table 8 provided on the bed 7; a pair of columns 9 standing perpendicularly on the bed 7 at both sides of the table 8; a top beam 10 connecting the upper portions of the columns 9; a cross beam 12 provided for upward and downward movement on a lifting guide 11 provided vertically at the front side of the columns 9; and a saddle swivel head 13 provided on the cross beam 12 and supporting a spindle head 13a. The saddle swivel head 13 has a saddle 15 provided on the cross beam 12 and movable along the same by a driving mechanism 14, a head body 17 provided on the saddle 15 for tilting movement by a tilting driving mechanism 16, a pair of hydraulic cylinders 18R and 18L provided at the sides of the head body 17 in the tilting direction and displaced in an interlocking relation to the tilting driving mechanism 16 and a hydraulic piping system 19 for applying swivel balancing pressures and back pressures to the hydraulic cylinders 18R and 18L. These hydraulic cylinders 18R and 18L are provided for swinging movement with a fulcrum p as a center. (In the explanation of the embodiment, "R" and "L" indicate the right and left sides as the saddle swivel head 13 is viewed from the front thereof, respectively.)

Figure 3:
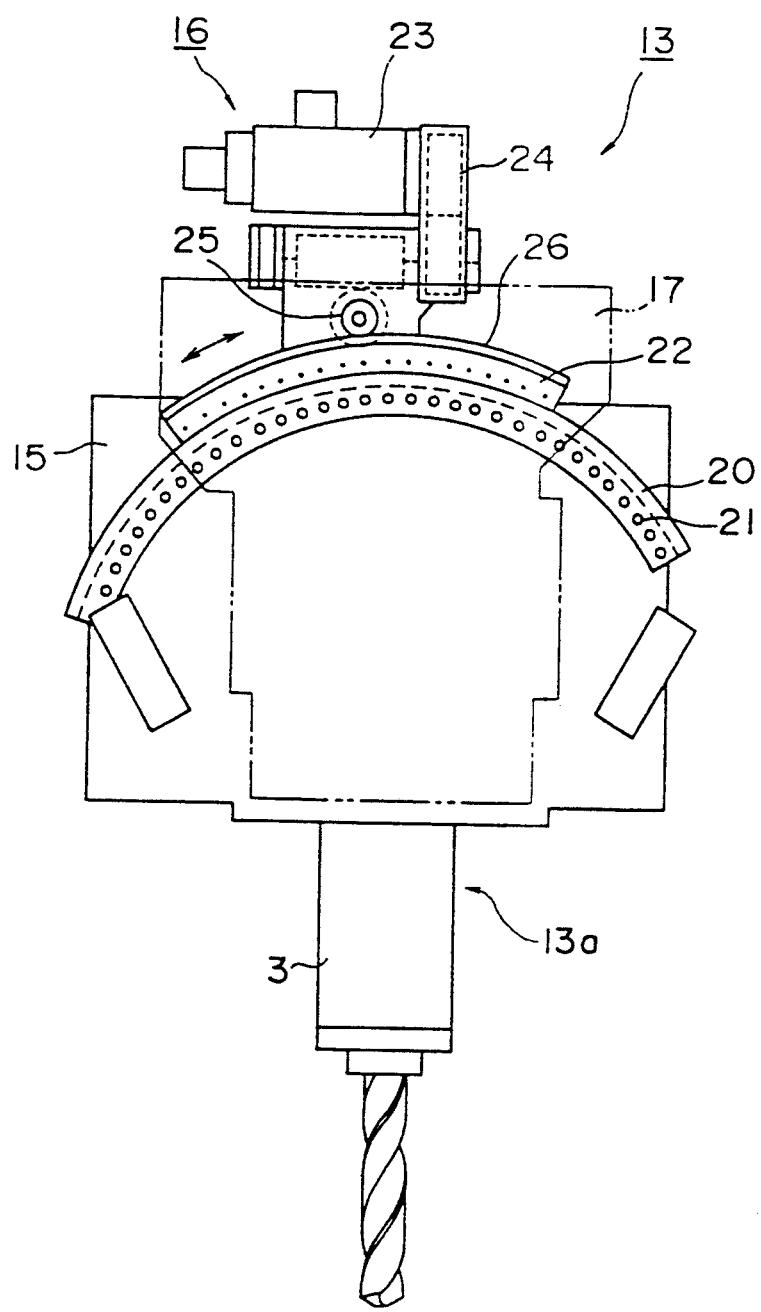
FIG. 3 is a schematic front view of the tilting driving mechanism of the saddle swivel head.

The saddle 15 is substantially in the form of a rectangle in the front thereof as shown in FIG. 3 and has, at the upper portion of the front, a circular arc-like rail member 20 secured by bolts 21. A circular arc-like slide member 22 shorter than the rail member 20 is slidably mounted on the outer circular arc of the rail member 20.

The saddle 15 is provided at the upper portion thereof with the driving mechanism 14 for moving the saddle swivel head 13 along the cross beam 12 as shown in FIG. 1 and with the tilting driving mechanism 16 of the head body 17 as shown in FIG. 3.

Figure 2:
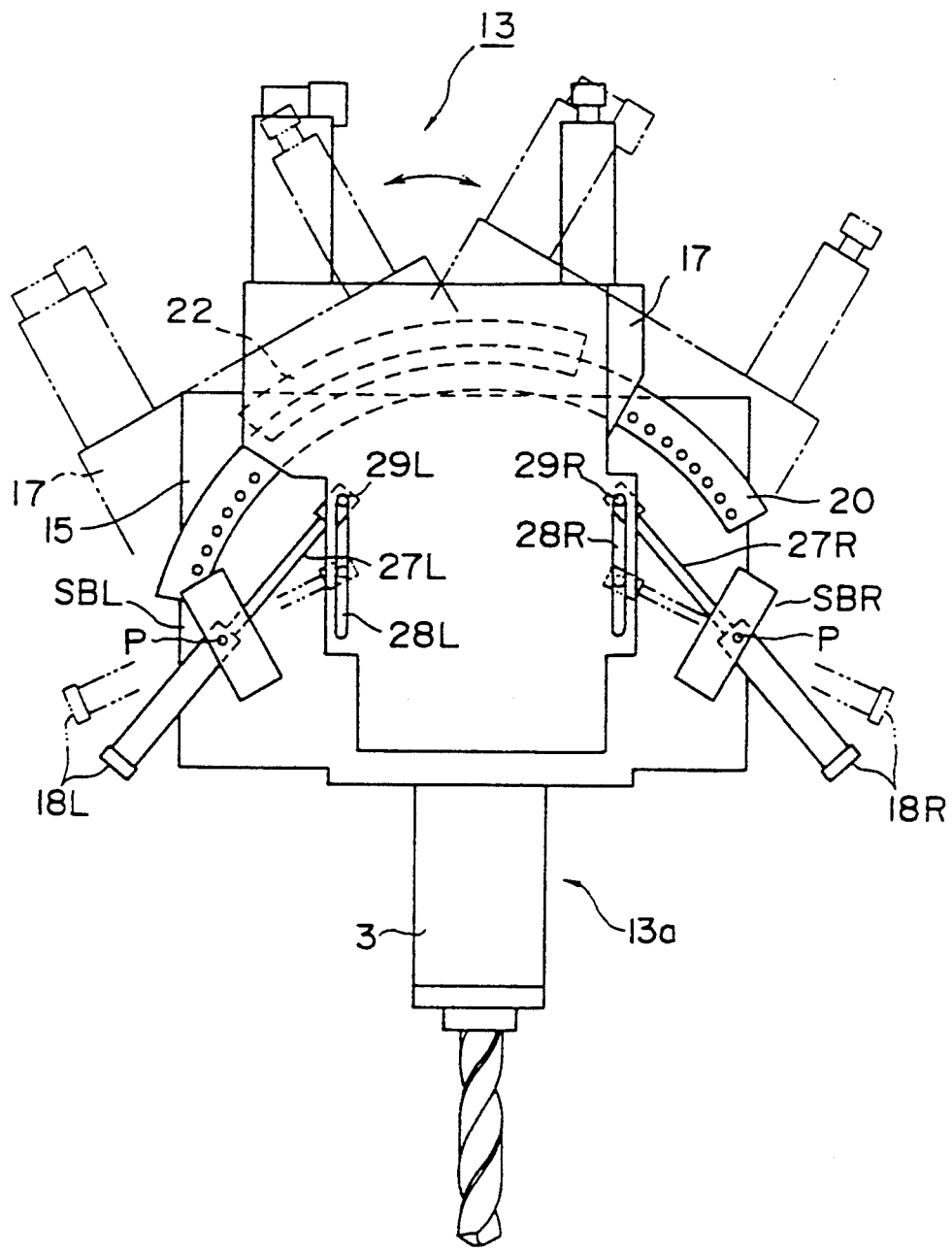
FIG. 2 is a front view illustrating one embodiment of the tilting device of the swivel head according to the invention.

The head body 17 is substantially in the form of a rectangle in the front thereof as shown in FIG. 2 and has, at the front thereof, the slide member 22 secured thereto and, at the center lower portion, the spindle head 3 to which a tool is clamped. The tilting driving mechanism 16 comprises a motor 23, a reduction mechanism 24 for transmitting the torque of the motor 23 and a pinion 25 which engages a circular arc-like rack 26 formed on the outer circular arc of the slide member 22. With this construction, driving the motor 23 causes the torque to be transmitted through the reduction gear 24 and the pinion 25 to the rack 26, so that the slide member 22 is moved along the circular arc of the rail member 20 and then the head body 17 secured to the slide member 22 is tilted.

Further, servo mechanisms SBR, SBL and hydraulic cylinders 18R, 18L are provided at the sides of the head body 17 in the tilting direction, as shown in FIG. 2. The ends of the rods 27R, 27L of the hydraulic cylinders 18R, 18L are slidably connected to vertically extending slots 28R, 28L formed at the lower sides of the head body 17.

Figure 4:
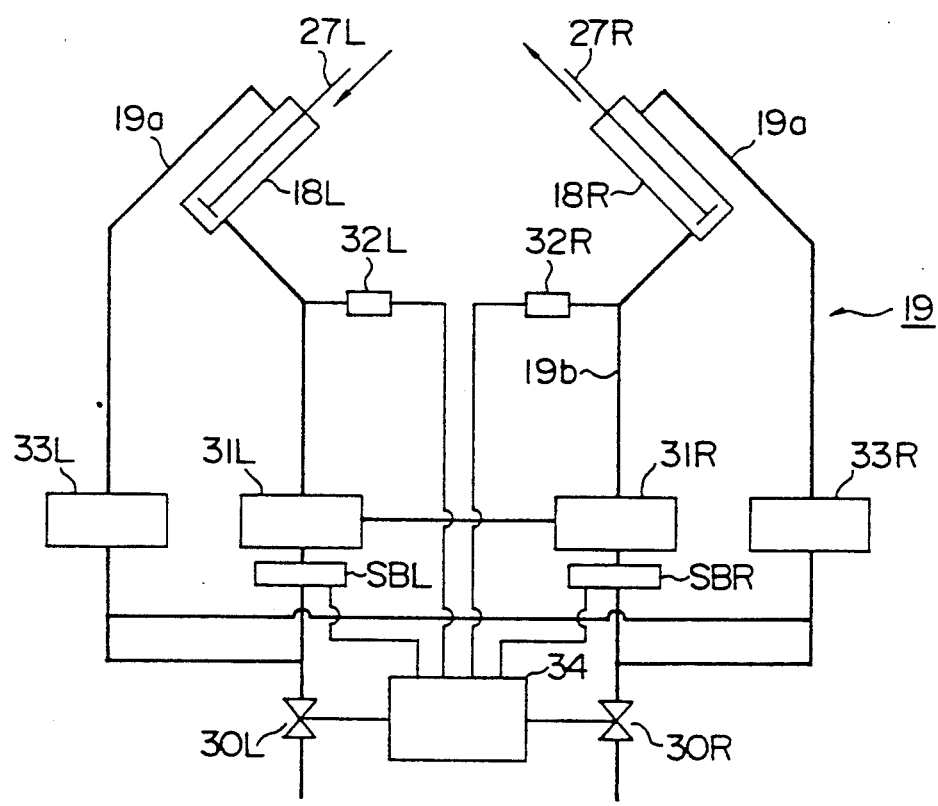
FIG. 4 is a block diagram illustrating a hydraulic piping system.
Figure 5:
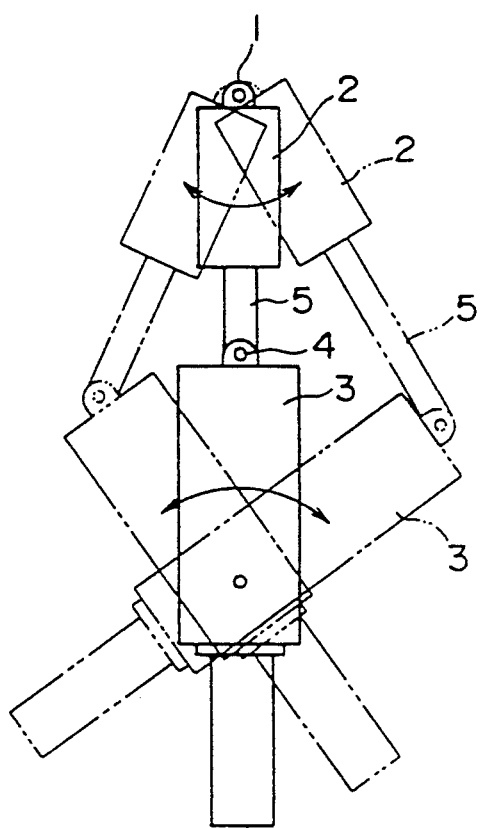
FIG. 5 is a fragmentary view showing an example of a conventional tilting device.

The hydraulic piping system 19 for operating the hydraulic cylinders 18R, 18L is constituted as shown in FIG. 4. That is, the hydraulic piping system 19 includes a back pressure regulating circuit 19a for regulating the back pressures to the hydraulic cylinders 18R, 18L and a swivel balancing circuit 19b for regulating the swivel balancing pressures to the spindle head 13a swiveled in the left and right directions. In order to apply the swivel balancing pressures and the back pressures to the hydraulic cylinders 18R, 18L at both sides of the head body 17, the hydraulic piping system 19 is further provided with proportional control valves 30R, 30L provided between an oil pressure generating source, not shown, and the system, and used for replacing the swivel balancing forces corresponding to the swivel angles measured by pulse-corders, not shown, with the hydraulic pressures; the servo mechanisms SBR, SBM for generating the hydraulic pressures corresponding to the command values of swivel balancing forces from the numerical control means 34; pressure regulators 31R, 31L for regulating the swivel balancing pressures at the left and right; pressure detectors 32R, 32L for detecting the swivel balancing pressures; and back pressure regulators 33R, 33L for regulating the back pressures at the left and right applied to the hydraulic cylinders 18R, 18L.

Now, the operation of the tilting device of the saddle swivel head will be explained as to the case where the saddle swivel head 13 is tilted by 30° to the left in FIG. 2.

When a command for tilting the saddle swivel head 13 by 30° to the left is transmitted from the numerical control means 34 of the planing machine 6 to the tilting driving mechanism 16 of the head body 17, the motor 23 is operated and the pinion 25 is rotated through the reduction gear 24 clockwise in FIG. 3, so that the rack 26 which engages the pinion 25 commences to perform a sliding movement along the rail member 20 to the left together with the slide member 22. This also causes the head body 17 secured to the slide member 22 to commence performance of a tilting movement to the left.

Simultaneously with this commencement of tilting movement, a signal of change in oil pressure to be supplied to the respective hydraulic cylinders 18R, 18L, corresponding to change in a tilting angle of the head body 17 is inputted to the proportional control valves 30R, 30L of the hydraulic piping system 19, and in response to these changes in pressure, oil for forward movement is fed to the hydraulic cylinder 18R through the servo mechanism SBR to move the rod 27R forward and oil for backward movement is fed to the hydraulic cylinder 18L through the servo mechanism SBL to move the rod 27L backward. The rod 27R is moved forward and the rod 27L is moved backward by carrying out an adjustment in distribution of pressures applied to the hydraulic cylinders 18R, 18L by the pressure regulators 31R, 31L, while detection of the swivel balancing pressures in the hydraulic cylinders 18R, 18L at each tilting angle by the pressure detectors 32R, 32L for the swivel balancing pressure is carried out until the head body 17 is tilted by 30° to the left.

When the rod 27R is moved forward and the rod 27L is moved backward until the head body 17 is tilted by 30° to the left, the back pressures required to hold the respective rods 27R, 27L of the hydraulic cylinders 18R, 18L in position are regulated by the back pressure regulators 33R, 33L, and then the swivel balancing pressures and the back pressures are applied to the hydraulic cylinders 18R, 18L. Thus, in the present embodiment, the hydraulic cylinders 18R, 18L are moved forward and backward in response to the tilting angle of the head body 17 and the tilting moment occurring following the tilting of the saddle swivel head 13 is compensated for, so that any excess load is applied to the tilting driving mechanism 16. The servo mechanism is used in the present embodiment, however a control circuit using PID (proportion, integration and differentiation) or a control circuit using IPD (proportion, integration and differentiation) may be used, the present invention not being limited thereto.

As explained above, in the present invention, since the tilting movement of the saddle swivel head is carried out by both the tilting driving mechanism and the adjusting hydraulic cylinders, a loading moment acting on the tilting driving mechanism becomes constant and no excess load is therefore applied to the tilting driving mechanism. Accordingly, the tilting device according to the invention does not require a greater tilting driving mechanism and is therefore made smaller in size.

Further, the combined use of the tilting driving mechanism with the adjusting hydraulic cylinders, as a tilting means, enables a rapid and accurate tilting operation of the saddle swivel head to be carried out without being affected by any backlash of the gears of the tilting driving mechanism, or by any difference in the response time of the adjusting hydraulic cylinders, and at the same time, enables the improvement of machining accuracy to be planned.

What is claimed is:

1. A tilting device for a saddle swivel head for a double housing type machine tool, said saddle swivel head having a saddle mounted for horizontal movement on a cross beam and a head body mounted on said saddle for swivel movement in the left and right directions and having a spindle head thereon, said tilting device comprising:
a tilting driving mechanism connected to said head body and for tilting said head body with a predetermined position as a center;
a pair of hydraulic cylinders arranged at both sides of said head body in the tilting direction with the end of the rod of each of said hydraulic cylinders being connected to each side of said head body, said rod performing a forward and backward movement following a tilted position of the head body; and
pressure regulating means for regulating pressures applied to said hydraulic cylinders.

2. The tilting device claimed in claim 1, wherein said tilting driving mechanism comprises a driving motor means; a transmission mechanism for transmitting a torque of said driving motor means; and a conversion mechanism engaging said transmission mechanism and for converting said torque to a tilting operation of said head body.

3. The tilting device claimed in claim 2, wherein said conversion mechanism comprises a pinion means which engages said transmission mechanism; and a circular arc-like gear means which engages said pinion means and which is secured to the head body.

4. The tilting device claimed in claim 1, wherein said head body is formed at its each side with a slot, in which the end of the rod of each of the hydraulic cylinders is slidably fitted, and each of said hydraulic cylinders is swingable with a predetermined position as a center.

5. The tilting device claimed in claim 1, wherein said pressure adjusting means comprises pressure regulators for regulating oil pressures applied to said hydraulic cylinders; back pressure regulators for regulating back pressures to said hydraulic cylinders; and a control means for controlling the operation of said pressure regulators and said back pressure regulators.

6. The tilting device claimed in claim 5, further including pressure detectors for detecting oil pressures; and proportional control valves for controlling the respective oil pressures to be supplied to said pair of hydraulic cylinders, following a tilted position of said head body.

* * * * *